US012630083B2

(12) United States Patent (10) Patent No.: US 12,630,083 B2

Ito (45) Date of Patent: May 19, 2026

(54) START SUPPORT DEVICE

(71) Applicant: TOYOTA JIDOSHA KABUSHIKI KAISHA, Toyota (JP)

(72) Inventor: Tatsuya Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 18/908,795

(22) Filed: Oct. 8, 2024

(65) Prior Publication Data

US 2025/0242753 A1 Jul. 31, 2025

(30) Foreign Application Priority Data

Jan. 26, 2024 (JP) ................................. 2024-010079

(51) Int. Cl.
B60Q 9/00 (2006.01)

(52) U.S. Cl.
CPC ...................................... B60Q 9/00 (2013.01)

(58) Field of Classification Search
None
See application file for complete search history.

(56) References Cited

U.S. PATENT DOCUMENTS 10,118,617 B2   11/2018   Urano et al.
10,137,894 B2   11/2018   Nakadori

| | | | |
|---|---|---|---|
| 10,290,210 B2 * | 5/2019 | Wolterman | G08G 1/096716 |
| 10,787,123 B1 * | 9/2020 | Kim | B60K 28/066 |
| 11,244,179 B2 | 2/2022 | Ikezawa et al. | |
| 11,964,559 B2 * | 4/2024 | Hayashi | B60K 31/0008 |
| 12,437,557 B2 * | 10/2025 | Jeong | G06V 10/25 |
| 2016/0280067 A1 * | 9/2016 | Cuddihy | B60N 2/002 |
| 2016/0375911 A1 * | 12/2016 | Coelingh | B60W 60/0053 |
| | | | 701/23 |
| 2018/0251066 A1 * | 9/2018 | Murata | B60W 30/12 |
| 2018/0257560 A1 * | 9/2018 | Kapuria | B60W 50/16 |
| 2019/0202472 A1 * | 7/2019 | Lee | B60W 30/16 |
| 2019/0359223 A1 * | 11/2019 | Duale | B60W 30/095 |
| 2021/0276484 A1 * | 9/2021 | Kim | B60Q 9/00 |
| 2023/0105672 A1 * | 4/2023 | Tojo | G07C 5/0808 |
| | | | 701/34.4 |
| 2024/0140434 A1 * | 5/2024 | Abe | B60W 30/182 |
| 2024/0174247 A1 * | 5/2024 | Yamaguchi | B60W 40/09 |
| 2024/0253658 A1 * | 8/2024 | Kume | B60W 40/08 |

FOREIGN PATENT DOCUMENTS

| | | | | | |
|---|---|---|---|---|---|
| CN | 121257958 A | * | 1/2026 | | |
| JP | 2010152494 A | * | 7/2010 | | |
| WO | WO-2023228687 A1 | * | 11/2023 | ............... | G08G 1/09 |

* cited by examiner

*Primary Examiner* — Fekadeselassie Girma
(74) *Attorney, Agent, or Firm* — SoraIP, Inc.

(57) ABSTRACT

The notification processing of the start operation delay of the vehicle by the driver is performed. In the notification processing, a timing for notifying the start operation delay is set using the first variable set using the passenger information, the second variable set using the driving environment information, and the third variable set using the learning value information. When the start operation by the driver is not detected until the timing of notifying the start operation delay elapses from the timing determined to permit the start of the vehicle, the notification device is activated.

4 Claims, 3 Drawing Sheets

START SUPPORT DEVICE

CROSS-REFERENCE TO RELATED APPLICATION

This application claims priority to Japanese Patent Application No. 2024-010079 filed on Jan. 26, 2024, incorporated herein by reference in its entirety.

BACKGROUND

1. Technical Field

The present disclosure relates to a device that supports start operation of a vehicle by a driver of the vehicle.

2. Description of Related Art

Japanese Unexamined Patent Application Publication No. 2010-152494 (JP 2010-152494 A) discloses a device that notifies a driver of start operation delay of a vehicle after a signal display color is switched from red to blue. The conventional device determines whether a start possible timing of the vehicle is delayed based on road linear information, signal information, or traffic jam information. For example, when another vehicle is staying in an intersection where a traffic light is installed, the conventional device determines that the start possible timing is delayed. When determining that the start possible timing is delayed, the conventional device delays the timing of notifying the start operation delay to the driver.

SUMMARY

There are individual differences in the timing of start operation. Therefore, when a driver recognizes the vehicle is in a start possible state and is going to perform the start operation at the timing of his/her preference, notifying the start operation delay bothers the driver and gives the driver uncomfortable feeling. In this regard, if customization setting for the notification of the start operation delay is available, it can be expected to bring the timing of notifying the start operation delay closer to the timing preferred by the driver. However, detailed customization setting prepared for notification of the start operation delay may instead hinder actual customization setting by the driver.

An object of the present disclosure is to provide a device capable of bringing a timing of notifying start operation delay of a vehicle by a driver closer to a timing preferred by the driver.

The present disclosure relates to a device that supports start operation of a vehicle by a driver of the vehicle, the device having the following characteristics.

The device includes: a storage device that stores various kinds of information; a processor that performs processing based on the various kinds of information, and a notification device that notifies the driver of start operation delay of the vehicle by the driver.

The various kinds of information include passenger information on the vehicle, driving environment information on the vehicle, and learning value information about a timing of the start operation by the driver.

The processing based on the various kinds of information includes processing for setting a first variable using the passenger information, processing for setting a second variable using the driving environment information, processing for setting a third variable using the learning value information, and notification processing for notifying the driver of the start operation delay.

In the notification processing, the processor sets a timing of notifying the start operation delay using the first variable, the second variable, and the third variable, determines whether to permit start of the vehicle using the driving environment information, and activates the notification device, when the start operation by the driver is not detected during a period from a timing of determining to permit the start of the vehicle to the timing of notifying the start operation delay.

According to the present disclosure, in the notification processing, the timing of notifying the start operation delay is set. The timing is set using the first variable that is set using the passenger information, the second variable that is set using the driving environment information, and the third variable that is set using the learning value information. The learning value information used for setting the third variable is information related to the timing of the start operation by the driver. Therefore, according to the timing set using the first to third variables, it is possible to bring the timing of notifying the start operation delay closer to the timing preferred by the drive without relying on detailed customization regarding the notification of the start operation delay.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. However, the structures and the like described in the following embodiments are not necessarily essential to the present disclosure except for the case where they are particularly explicitly described or are clearly specified in principle.

1. Configuration Example

Figure 1:
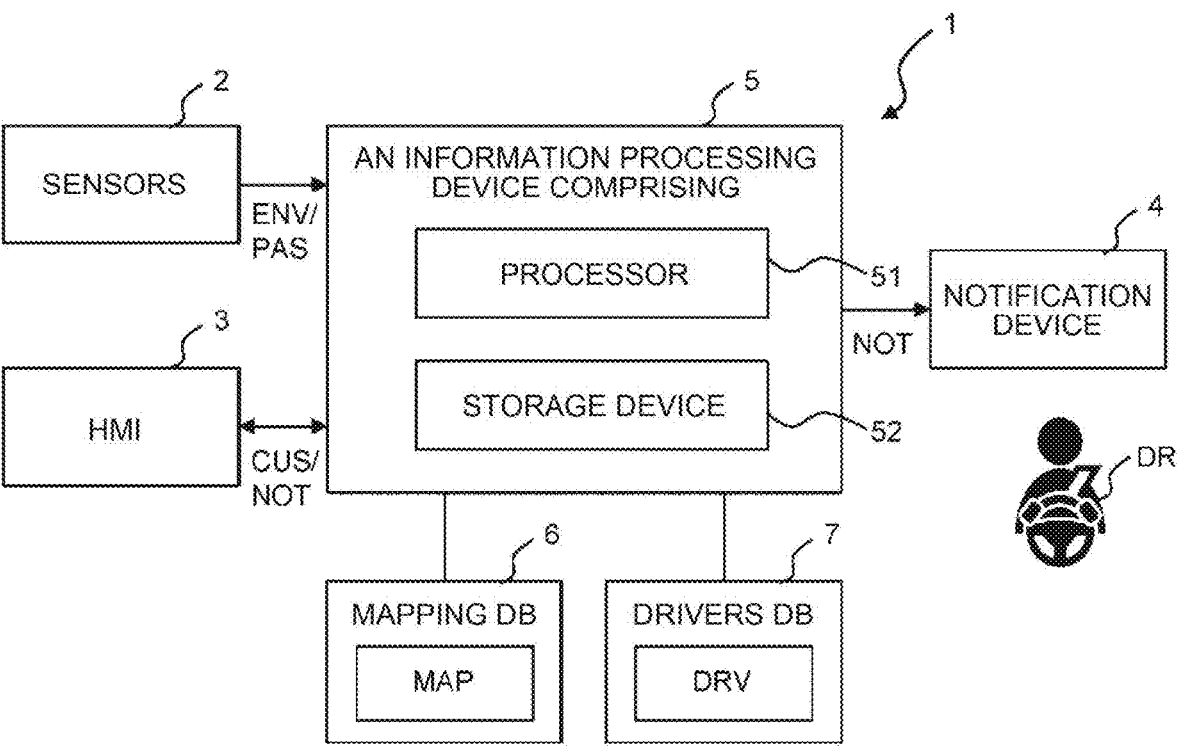
FIG. 1 is a diagram illustrating a configuration example of a start support device according to an embodiment.

The start support device according to the embodiment is a device that supports a start operation of the vehicle by a driver DR of the vehicle. FIG. 1 is a diagram illustrating a configuration example of a start support device according to an embodiment. In the embodiment illustrated in FIG. 1, the start support device 1 includes sensors 2, an HMI (Human Machine Interface) unit 3, a notification device 4, an information processing device 5, a map database (Database) 6, and a driver database 7. The start support device 1 is mounted on a vehicle. A part of the start support device 1 may be included in the external server.

The sensors 2 include a recognition sensor, a position sensor, and a state sensor. The recognition sensor recognizes an ambient condition of the vehicle. Examples of the recognition sensor include a camera, a millimeter-wave radar, and a LiDAR (Light Detection and Ranging). The position sensor acquires position and azimuth data of the vehicle. Examples of the position sensor include a GNSS (Global Navigation Satellite System) receiver. The state sensor detects the speed, acceleration (for example, longitudinal acceleration and lateral acceleration) of the vehicle, yaw rate, turning angle of the wheel, steering angle of the steering wheel, and the like. The information acquired by the recognition sensor, the position sensor, and the status sensor constitutes the driving environment information ENV of the vehicle. The driving environment information ENV is transmitted to the information processing device 5.

The sensors 2 also include occupant sensors. The occupant sensor recognizes or detects an occupant of the vehicle. Examples of the sensor for recognizing the occupant include an indoor camera and an infrared sensor. As a sensor for detecting an occupant, a seating sensor provided in a seat is exemplified. The information acquired by the occupant sensor constitutes the passenger information PAS. The passenger information PAS is transmitted to the information processing device 5.

HMI unit 3 is a terminal for providing information to the driver DR and for receiving information from the driver DR. HMI unit 3 includes, for example, an inputting device, a displaying device, a microphone, a buzzer, and a speaker. Examples of the input device include a touch panel, a switch, and a button. The information provided to the driver DR includes information on the traveling condition of the vehicle and notification information NOT for notifying a delay in starting the vehicle by the driver DR. When the notification information NOT is provided, HMI unit 3 functions as a "notification device" of the present disclosure. Provision of information to the driver DR is performed by using at least one of a display device, a buzzer, and a speaker.

The information received from the driver DR includes a customized information CUS related to the start operation. In order to minimize the burden on the driver DR, the customized information CUS includes information (notification need information) indicating whether or not the driver DR needs to notify the start operation delay, and information (learning need information) indicating whether or not the driver DR needs to learn the start operation. Reception of information from the driver DR is performed using at least one of an input device and a microphone. When the customized information CUS is received, the customized information CUS is transmitted to the information processing device 5.

The notification device 4 is a device that prompts the driver DR to start. Examples of the notification device 4 include a vibration device of a steering wheel and a vibration device of a driver's seat. When the notification information NOT is received from the information processing device 5, the notification device 4 is activated.

The information processing device 5 includes at least one processor 51 and at least one storage device 52. The processor 51 executes various processes. Examples of the processor 51 include CPU (Central Processing Unit), GPU (Graphics Processing Unit), ASIC (Application Specific Integrated Circuit), FPGA (Field-Programmable Gate Array), and the like. The storage device 52 stores various types of information. Examples of the storage device 52 include volatile memory, non-volatile memory, HDD (Hard Disk Drive), SSD (Solid State Drive), and the like.

The map DB6 is formed in a predetermined storage device (for example, a non-volatile recording medium such as a hard disk or a flash memory). The map DB6 stores map information MAP. The map information MAP includes a generic navigational map. Examples of the information included in the navigation map include information on a location of a road, information on a section of a road (for example, a general road and an expressway), information on an arrangement of a lane, information on a shape of a lane (for example, a curve and a straight line), information on an intersection and a location of a structure (for example, a traffic light).

Like the map DB6, the driver DB7 is formed in a predetermined storage device. The driver DB7 stores a driver information DRV. Examples of the driver information DRV include identification information of the driver DR (biometric authentication information such as fingerprints and facial images), vehicle key information used by the driver DR, customized information CUS of the driver DR, and learning value information LER regarding timings of starting operations of the vehicle by the driver DR. The driver information DRV and the learning value information LER store up-to-date information. For example, when the customized information CUS is input via HMI unit 3, the customized information CUS is updated by the input information. When a learning value related to the driver DR is generated, the learning value information LER is updated by the generated information.

2. Features of the Embodiments

As described above, there are individual differences in the timing at which the vehicle is started. In addition, there are individual differences in the degree of the start support of the notification of the start operation delay. Therefore, in the embodiment, the notification of the start-operation delay and the timing of the notification are set for each driver DR by referring to the customized information CUS and the learning value information LER for each driver DR. Processing particularly related to the features of the embodiments will be described below.

2-1. Notification Processing of Start Operation Delay

Figure 2:
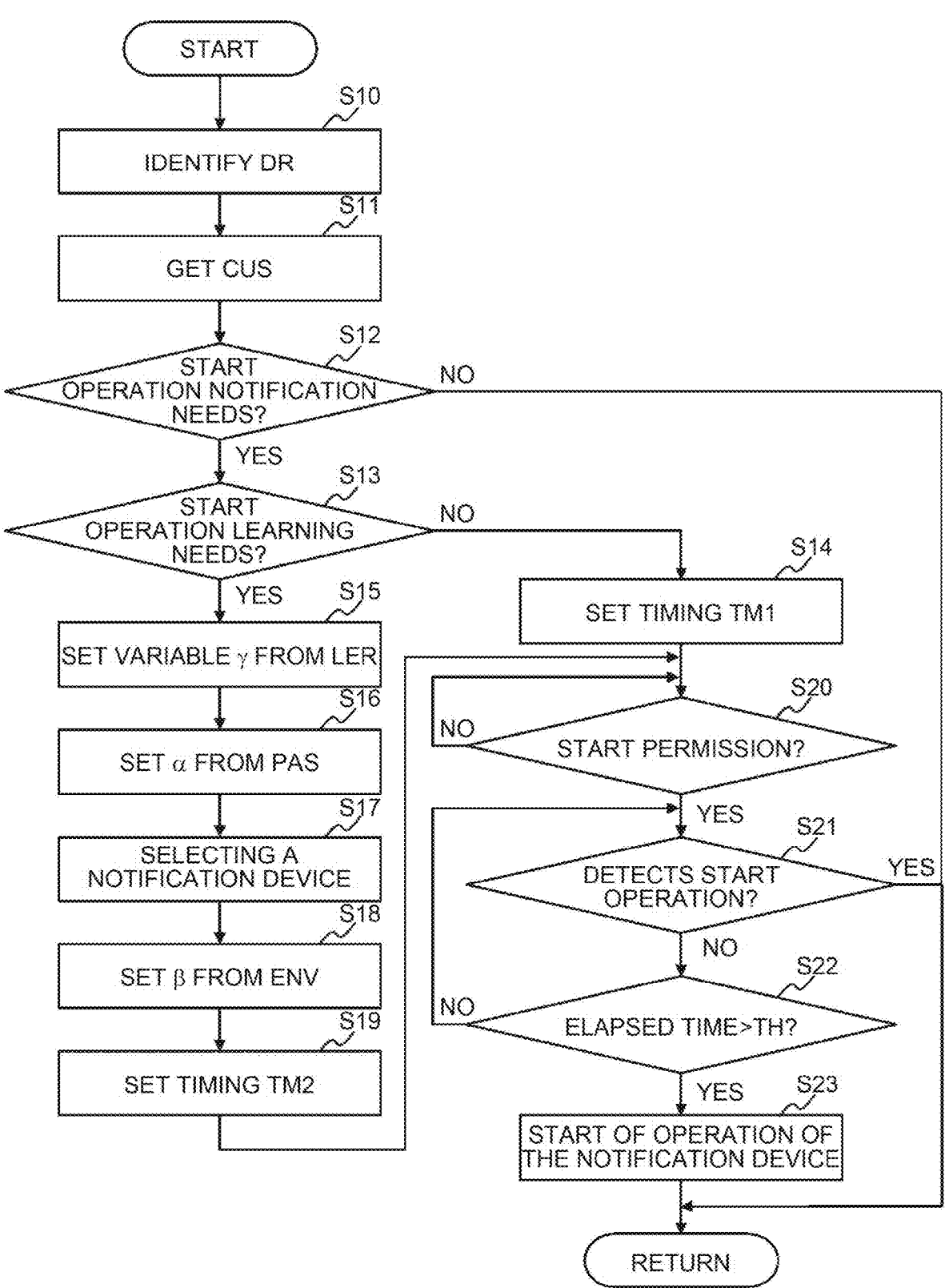
FIG. 2 is a flow chart illustrating a flow of a notification process of a start-operation delay performed in the embodiment.

FIG. 2 is a flowchart illustrating a flow of notification processing of a start operation delay performed in the embodiment. The routine illustrated in FIG. 2 is realized, for example, by the processor 51 executing a predetermined program stored in the storage device 52 illustrated in FIG. 1. The routine shown in FIG. 2 is also repeatedly executed at a predetermined cycle.

In the routine shown in FIG. 2, a driver DR is first identified (S10). The identification of the driver DR is performed by, for example, fingerprint authentication or facial authentication of the driver DR. In another embodiment, the driver DR is determined based on the vehicle key used by the driver DR.

Following S10 process, a customized information CUS is obtained (S11). The customized information CUS is DR of drivers identified in S10 process. Depending on DR of drivers, there may be no customized information CUS.

Subsequent to S11 process, it is determined whether there is a notification need for a start-up operation (S12). The information on the notification need is included in the customized information CUS obtained in S11 process. If the customized information CUS does not exist, there is also no notification need information. In this case, the notification of the start operation is set to OFF, and the notification process is terminated. If the notification need is included in the customized information CUS, S13 is processed.

In S13 process, it is determined whether or not there is a need to learn the start manipulation. The learning-need information is included in the customized information CUS acquired in S11 process. While the information of the notification needs is included in the customized information CUS, the learning needs may not be included in the customized information CUS. In this situation, S14 process is performed assuming that S13 determination is negative. When the training needs are included in the customized information CUS, S15 process is performed.

In S14 process, a timing TM1[s] at which the notification of the start operation is started is set. The timing TM1 is set to, for example, a normal timing (default-value). In another embodiment, the customized information CUS includes sensitivity information set by the driver DR. In another embodiment, the timing TM1 is set to a timing such as a standard timing, a timing earlier than a standard, or a timing later than a standard, based on the sensitivity data.

In S15 process, γ[s] is set from the learning value information LER. The variable γ is an example of a "third variable" of the present disclosure. The learning value information LER is obtained by referring to the driver DB7 using the information on the starting scene of the vehicle estimated from the driving environment information ENV and the information on the driver DR specified in S10 process. Estimation of the starting scene is performed by extracting, from the driving environment information ENV, factors of the starting scene such as, for example, information on the road segment, information on the number of traveling lanes, and information on the traveling condition of the surrounding vehicles, and using variables corresponding to the extracted factors. For example, assuming that the variable of the road segment is x, the variable of the traveling lane count is y, and the variable of the traveling condition of the surrounding vehicle is z, the starting scene is estimated from the variable x,y,z.

Following S15 process, the parameter α[%] is set from the passenger information PAS (S16). The variable α (0-100%) is an example of a "first variable" of the present disclosure. The variable α is a variable that is set considering that, when a passenger is present, the notification of the start-operation delay is troublesome for the driver DR. Therefore, the variable α increases as the number of passengers increases. When the driver DR provides a service to the passenger, the driver DR and the passenger are also troubled by the notification of the start operation delay. Therefore, the parameter α may be set using the passenger information PAS in which the type of the vehicle (private vehicle, commercial vehicle) and the seating position of the passenger are combined.

Following S16 process, a notification device is selected (S17). As candidates for the notification device, the notification device 4 and HMI unit 3 illustrated in FIG. 1 can be considered. When there is a plurality of notification device candidates, it is not desirable to notify the start operation delay from all the notification devices 4. Therefore, in S17 process, the notification device is selected by using the parameter α relating to the troublesomeness set in S16 process. For example, as the variable α decreases, the number of notification devices increases, and as the variable α increases, the number of notification devices decreases. In another embodiment, a notification device (HMI unit 3) to which the notification of the start operation delay is easily transmitted is selected when the variable α is small, and a notification device 4 (the vibrating device) to which the notification is relaxed is selected when the variable α is large.

Following S17 process, a variable β[s] is set from the driving environment information ENV (S18). The variable β is an example of a "second variable" of the present disclosure. The variable β is a variable set in consideration of being allowed to delay the notification of the start operation delay depending on the driving environment of the vehicle. Variable β is set based on the factors of the starting scenes of the vehicles which are estimated from the driving environment information ENV. When setting the variable γ, information of the starting scene and information of the driver DR are considered, whereas when setting the variable β, only information of the starting scene is considered.

Following S18 process, a timing TM2[s] for starting the notification of the start operation is set (S19). The timing TM2 is set using Equation (1) below, which includes variables γ, α, and β set in S15, S16 and S18, respectively.

$$TM2 = \gamma(x, y, z, \dots ) + f(a) + \beta(x, y, z, \dots ) \qquad (1)$$

Subsequent to S14 or S19 process, it is determined whether or not to allow the vehicle to start (S20). Whether or not the vehicle is permitted to start is performed based on the driving environment information ENV. For example, when the switching of the display color of the traffic light is recognized or when the start of the preceding vehicle is recognized, the start of the vehicle is permitted. When the start of the preceding vehicle is recognized but the stop of the preceding vehicle is recognized first, the start of the vehicle is not permitted. S20 process is repeated until a positive outcome is obtained.

If S20 determination is affirmative, it is determined whether or not a start-up action by the driver DR has been detected (S21). The start operation by the driver DR is detected by, for example, an operation of the accelerator pedal or an operation release of the brake pedal. When the start operation is detected, it is not necessary to notify the start operation delay, and thus the notification process is ended.

If S21 determination is negative, it is determined whether or not the elapsed time from the timing at which it is determined that the start of the vehicle is permitted exceeds the threshold TH (S22). The timing at which it is determined that the vehicle is permitted to start is, for example, a timing at which S20 process is completed. The threshold TH is a value (TS2+δ) obtained by adding a predetermined margin 6 to the timing TS1 set by S14 or the timing TS2 set by S19.

If S22 determination is negative, the process returns to S21 process. On the other hand, when S22 determination is affirmative, the operation of the notification device is started (S23). When S23 process is performed, the start-operation delay is notified to the driver DR.

2-2. Process for Generating Learning Value Information

Figure 3:
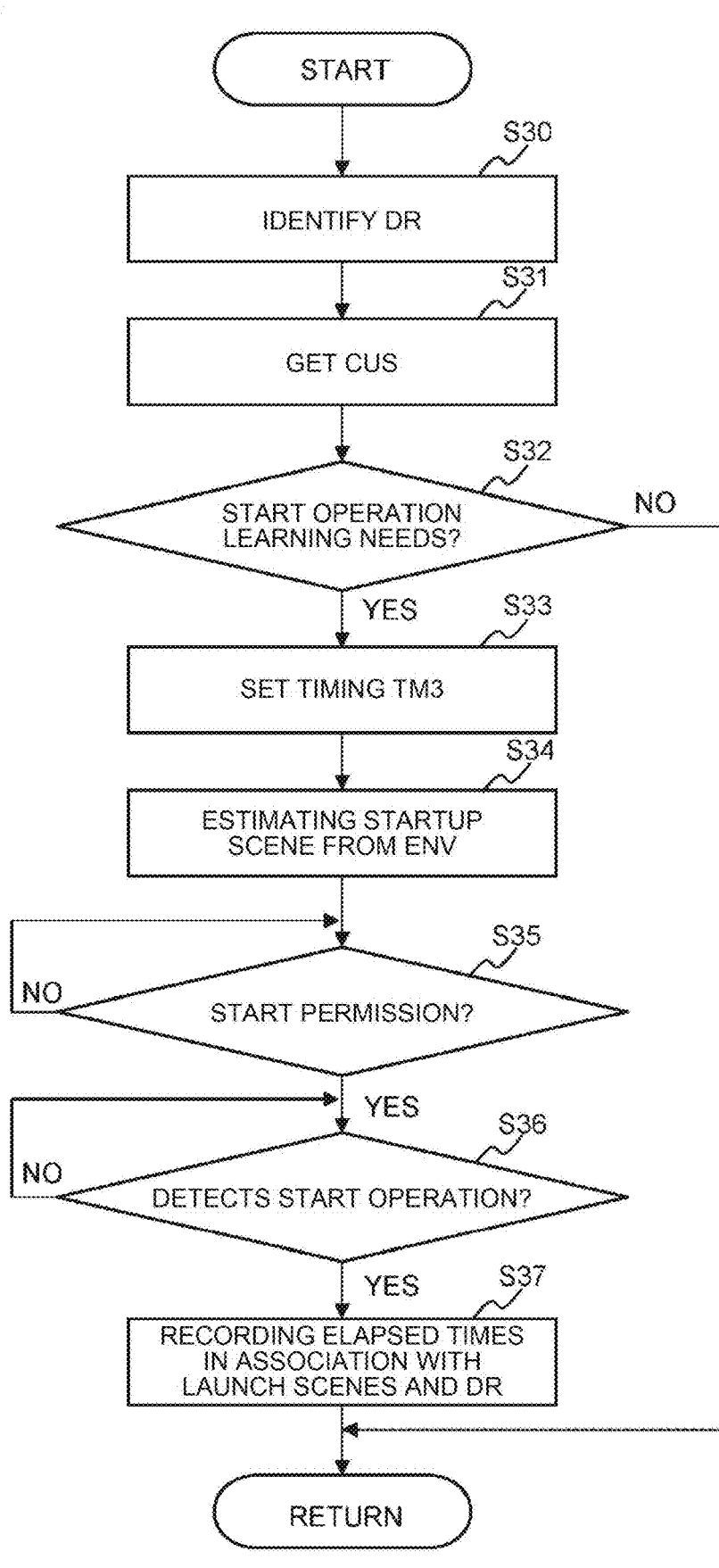
FIG. 3 is a flowchart illustrating a flow of a process of generating learning value information performed in the embodiment.

FIG. 3 is a flow chart illustrating a flow of a process of generating the learning value information LER performed in the embodiment. The routine illustrated in FIG. 3 is realized, for example, by the processor 51 executing a predetermined program stored in the storage device 52 illustrated in FIG. 1. The routine shown in FIG. 3 is also repeatedly executed at a predetermined cycle.

In the routine shown in FIG. 3, S30, S31 and S32 processes are performed first. S30 and S31 processes are the same as S10 and S11 processes of FIG. 2. S32 process is the same as the process of S13 of FIG. 2.

When S32 determination is affirmative, a timing TM3[s] at which the notification of the start operation is started is set (S33). The timing TM3 is set to, for example, a timing later than the timing TM1 described in S14 of FIG. 2. When the notification process of the start-operation delay is executed at the timing TM1, the generation of the learning value information LER is hindered, and the learning value information LER specific to the driver DR cannot be obtained. In particular, there is no or less learning value information LER at an early stage of learning. Therefore, when the process of generating the learning value information LER is performed, S33 process is performed so as to actively collect the learning value information LER.

S33 process is followed by S34, S35 and S36 processes. S34 process estimates a starting scene from the driving environment information ENV. The content of S35 process is the same as the content of the process performed in S18 of FIG. 2. The details of the processes of S35 and S36 are the same as the details of the processes of S20 and S21 in FIG. 2.

When the determination result of S36 is affirmative, the elapsed time from the timing at which the start operation of the vehicle is detected to the timing at which the start operation of the vehicle is determined to be permitted is recorded in association with the start scene estimated in the processing of S34 and the driver DR specified in S30 (S37). The information on the elapsed time is learning value information LER.

3. Effects

As described above, according to the embodiment, the timing TM2 for notifying the start operation delay is set in the notification process of the start operation delay. The timing TM2 is set using a variable $\alpha$ set using the passenger information PAS, a variable $\beta$ set using the driving environment information ENV, and a variable $\gamma$ set using the learning value information LER. The learning value information LER used for setting the variable $\gamma$ is information related to the timing of the starting operation by the driver DR. Therefore, according to the above-described timings set by using the variables $\alpha$, $\beta$, and $\gamma$, the timing at which the start operation delay is notified can be brought close to the preferred timing of the driver DR without resorting to fine customization regarding the notification of the start operation delay.

What is claimed is:

1. A start support device that is a device that supports start operation of a vehicle by a driver of the vehicle, the start support device comprising:

a storage device that stores various kinds of information;

a processor that performs processing based on the various kinds of information; and a notification device that notifies the driver of start operation delay of the vehicle by the driver, wherein the various kinds of information include passenger information on the vehicle, driving environment information on the vehicle, and learning value information about a timing of the start operation by the driver, the processing based on the various kinds of information includes processing for setting a first variable using the passenger information, processing for setting a second variable using the driving environment information, processing for setting a third variable using the learning value information, and notification processing for notifying the driver of the start operation delay, in the notification processing, the processor sets a timing of notifying the start operation delay using the first variable, the second variable, and the third variable, determines whether to permit start of the vehicle using the driving environment information, and activates the notification device, when the start operation by the driver is not detected during a period from a timing of determining to permit the start of the vehicle to the timing of notifying the start operation delay.

2. The start support device according to claim 1, wherein the notification device includes at least two notification devices, and the processing based on the various kinds of information further includes selection processing for selecting, out of the at least two notification devices, the notification device to be activated in the notification processing using the first variable.

3. The start support device according to claim 1, wherein the processing based on the various kinds of information further includes generation processing of the learning value information, and in the generation processing, the processor estimates a start scene of the vehicle using the driving environment information, determines whether to permit the start of the vehicle using the driving environment information, counts an elapsed time from the timing of determining to permit the start of the vehicle to the timing of the start operation by the driver, and generates the learning value information by associating the elapsed time with the start scene.

4. The start support device according to claim 3, wherein the processing based on the various kinds of information further includes determination processing of determining whether there is a learning need for the start operation by the driver, and the processor performs the generation processing, when determination is made that there is the learning need in the determination processing, and sets, in a case of performing the generation processing, the timing of notifying the start operation delay to be later than the timing set when determination is made that there is no learning need in the determination processing.

*   *   *   *   *